No. 628,073. Patented July 4, 1899.
C. CORNELIUS.
DOUGH MIXER.
(Application filed Oct. 26, 1898.)
(No Model.)

Witnesses
J. G. Hinkel
William E. Neff

Inventor
Clyde Cornelius
By Watson & Watson
Attorneys

UNITED STATES PATENT OFFICE.

CLYDE CORNELIUS, OF WILKES-BARRÉ, PENNSYLVANIA, ASSIGNOR TO RICHARD O'CONNOR, OF SAME PLACE.

DOUGH-MIXER.

SPECIFICATION forming part of Letters Patent No. 628,073, dated July 4, 1899.

Application filed October 26, 1898. Serial No. 694,573. (No model.)

*To all whom it may concern:*

Be it known that I, CLYDE CORNELIUS, a citizen of the United States, residing at Wilkes-Barré, in the county of Luzerne and State of Pennsylvania, have invented certain new and useful Improvements in Dough-Mixers, of which the following is a specification.

My invention relates to improvements in dough-mixers for family use; and it consists particularly in improved and simple means for mounting the shaft carrying the mixing-blades, whereby the shaft and blades can be readily inserted within the mixing vessel or removed therefrom for the purpose of cleaning or removing the dough.

Figure 1:
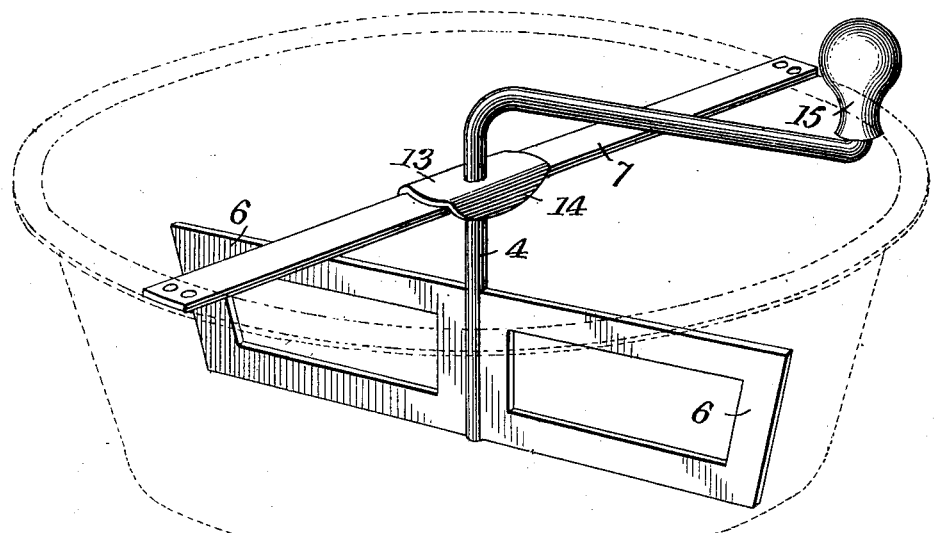
Figure 2:
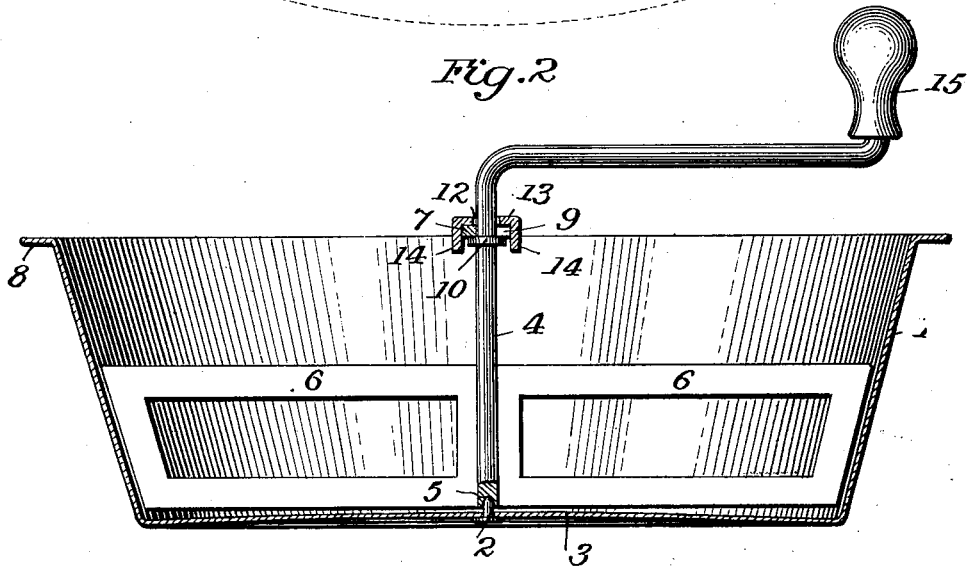

In the accompanying drawings, which illustrate my invention, Figure 1 is a perspective view of a complete dough-mixer embodying my improvements, the vessel being shown in dotted lines. Fig. 2 is a central vertical section through the mixer, and Fig. 3 is a perspective view in detail of the parts for securing the shaft in its bearings.

Referring to the drawings, 1 indicates a vessel for receiving the dough, having a pintle 2 projecting upwardly from the center of its bottom 3. This pintle forms a step-bearing for a shaft 4, the latter having a depression 5 in its end, which fits over the pintle.
The shaft is provided with a pair of radially opposite mixing-blades 6, each of which, as shown, consists of a rectangular frame secured to the shaft. A brace or bar 7 extends diametrically across the top of the vessel and is rigidly secured at its opposite ends to the flange 8 thereof by any suitable means, such as solder or rivets. This brace is formed with a notch 9 midway of its length, this notch being directly over the pintle 2. When the shaft is in position, its lower end will rest upon the pintle and the upper part of the shaft will lie in the notch 9. The shaft is held from moving vertically by a nut or boss 10 thereon, which underlies the brace 7. A clip 11, having a circular opening or perforation 12, which forms the upper shaft-bearing, is arranged upon the shaft above the boss 10. This clip is formed with a flat top surface 13, having on opposite sides downwardly-projecting flanges 14. The clip is movable lengthwise of the shaft, and when the latter is in its operative position the clip is moved downward until the top 13 comes in contact with the brace 7, the flanges 14 extending down over the sides of said brace, as shown in Figs. 1 and 2. When the clip is in this position, the shaft will be held within the notch, and it may be turned by means of the handle 15.

Figure 3:
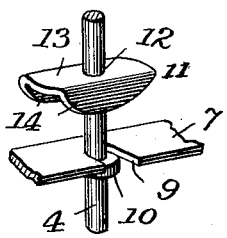

To remove the shaft and blades from the vessel for any purpose, it is only necessary to turn the blades parallel with the brace 7 and to raise the clip from said brace to the position shown in Fig. 3, when the shaft may be tilted sidewise until the boss 10 is clear of the brace and the shaft and blades may be bodily removed from the vessel. By reversing the operation the shaft and blades may be as readily replaced in operative position.

Having described my invention, what I claim, and desire to secure by Letters Patent, is—

1. In a dough-mixer, the combination with the vessel having a central bearing, and a vertical shaft mounted on said bearing and having mixing-blades attached thereto, of a brace secured to and extending across the upper part of said vessel and having a notch in its side adapted to receive the shaft, and means for removably securing the shaft within the notch, whereby the shaft and blades may be removed from the vessel, substantially as described.

2. In a dough-mixer, the combination with the vessel having a central bearing and a vertical shaft mounted on said bearing and having mixing-blades attached thereto, of a brace secured to and extending over said vessel and having a notch in its side adapted to receive the shaft, and a clip movable along the shaft and having side flanges adapted to fit over said brace, substantially as described.

3. In a dough-mixer, the combination with the vessel and a brace extending over said vessel and having a notch midway of its length, of a shaft journaled in said vessel and extending through said notch, blades secured to the lower part of said shaft, a boss above said blades and a movable clip upon the shaft having flanges adapted to fit over the edges of said brace, substantially as described.

In testimony whereof I affix my signature in presence of two witnesses.

CLYDE CORNELIUS.

Witnesses:
 W. L. RAEDER,
 M. H. McPNIFF.